(12) United States Patent
Ferreira et al.

(10) Patent No.: US 11,409,574 B2
(45) Date of Patent: Aug. 9, 2022

(54) INSTANCE CREATION IN A COMPUTING SYSTEM

(71) Applicant: Core Scientific, Inc., Bellevue, WA (US)

(72) Inventors: Ian Ferreira, Issaquah, WA (US); Max Alt, San Francisco, CA (US)

(73) Assignee: Core Scientific Operating Company, Bellevue, WA (US)

( * ) Notice: Subject to any disclaimer, the term of this patent is extended or adjusted under 35 U.S.C. 154(b) by 18 days.

(21) Appl. No.: 17/151,430

(22) Filed: Jan. 18, 2021

(65) Prior Publication Data

US 2022/0043680 A1 Feb. 10, 2022

Related U.S. Application Data

(60) Provisional application No. 63/067,047, filed on Aug. 18, 2020, provisional application No. 63/064,589, filed on Aug. 12, 2020, provisional application No. 63/061,132, filed on Aug. 4, 2020.

(51) Int. Cl.

| G06F 9/50 | (2006.01) |
|---|---|
| G06F 3/0481 | (2022.01) |
| G06F 3/0484 | (2022.01) |
| G06F 9/455 | (2018.01) |

(52) U.S. Cl.
CPC .......... *G06F 9/5055* (2013.01); *G06F 3/0481* (2013.01); *G06F 3/0484* (2013.01); *G06F 9/45533* (2013.01); *G06F 9/505* (2013.01); *G06F 9/5011* (2013.01); *G06F 9/5077* (2013.01); *G06F 2209/501* (2013.01); *G06F 2209/503* (2013.01)

(58) Field of Classification Search
CPC .... G06F 9/5055; G06F 3/0481; G06F 3/0484; G06F 9/45533; G06F 9/5011; G06F 9/505; G06F 9/5077; G06F 2209/501; G06F 2209/503; G06F 9/5066
See application file for complete search history.

(56) References Cited

U.S. PATENT DOCUMENTS

| 7,617,498 B1 | 11/2009 | Lumsden | |
|---|---|---|---|
| 8,296,419 B1 * | 10/2012 | Khanna | G06F 9/5083 718/1 |
| 9,621,428 B1 * | 4/2017 | Lev | H04L 41/0806 |

(Continued)

OTHER PUBLICATIONS

International Search Report and Written Opinion dated Nov. 15, 2021 for International Patent Application No. PCT/US21/44347.

*Primary Examiner* — Brian W Wathen
(74) *Attorney, Agent, or Firm* — Fishman Stewart PLLC

(57) ABSTRACT

A system and method for efficiently creating and managing application instances in distributed computing systems is disclosed. Controls are presented for specifying an application for instantiation, a data file for use with the application, and a destination for results from the application. Application resources and topology may be recommended to the user based on prior application execution, and CPU, GPU, and interconnect parameters such as bandwidth and latency. The controls may enable to user to customize the recommendations prior to automated instantiation based on the user's needs, such as whether the application is to be run in batch mode or interactive mode.

19 Claims, 16 Drawing Sheets

(56) References Cited

U.S. PATENT DOCUMENTS

| | | | |
|---|---|---|---|
| 2009/0006070 A1 | 1/2009 | Sasatani et al. | |
| 2013/0232463 A1* | 9/2013 | Nagaraja | G06F 3/0482 |
| | | | 717/101 |
| 2016/0019636 A1* | 1/2016 | Adapalli | H04L 47/78 |
| | | | 705/26.81 |
| 2017/0373940 A1 | 12/2017 | Shahab et al. | |
| 2020/0073739 A1 | 3/2020 | Rungta et al. | |
| 2020/0110647 A1* | 4/2020 | Souche | G06F 11/0709 |

* cited by examiner

INSTANCE CREATION IN A COMPUTING SYSTEM

CROSS-REFERENCE TO RELATED APPLICATIONS

This application claims the benefit of U.S. Provisional Patent Application Ser. No. 63/061,132, filed on Aug. 4, 2020, and titled "INSTANCE CREATION IN A COMPUTING SYSTEM", the contents of which are hereby incorporated by reference in their entirety.

This application claims the benefit of U.S. Provisional Patent Application Ser. No. 63/064,589, filed on Aug. 12, 2020, and titled "SCALABILITY ADVISOR", the contents of which are hereby incorporated by reference in their entirety.

This application claims the benefit of U.S. Provisional Patent Application Ser. No. 63/067,047, filed on Aug. 18, 2020, and titled "RANKING COMPUTING RESOURCES", the contents of which are hereby incorporated by reference in their entirety.

TECHNICAL FIELD

The present disclosure generally relates to the field of computing and, more particularly, to systems and methods for efficiently creating and managing application instances in computing systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing tasks such as machine learning (ML), artificial intelligence (AI), data mining, and scientific simulation (often called workloads) frequently require large amounts of computing resources, including storage, memory, and computing power. As the time required for a single system or processor to complete many of these tasks would be too great, they are typically divided into many smaller tasks that are distributed to large numbers of computing devices or processors such as central processing units (CPUs) or graphics processing units (GPUs) within one or more computing devices (called nodes) that work in parallel to complete them more quickly. Specialized computing systems (often called clusters) have been built that offer large numbers of nodes that work in parallel have been designed complete these tasks more quickly and efficiently. Clusters can have different topologies (i.e., how compute resources are interconnected within a node or over multiple nodes). Groups of these specialized computing systems can be used together (both locally and remotely) to create large and complex distributed systems able to handle the highly complex computational workloads.

Properly setting up and configuring these computing systems can be difficult and time consuming for users. A typical end user may be a data scientist or artificial intelligence or machine learning specialist, not a systems engineer specializing in deployment. Unlike the simple process of downloading and installing an app on a phone or PC, in distributed computing systems the process is much more complex and time consuming. To run a machine learning experiment, a data scientist may have to first configure multiple different system parameters on many different nodes in the distributed system, including memory allocations, network connections, and storage. Then the data scientist must install the application to those nodes and configure the application so that it is aware of the topology the data scientist has configured with the nodes and network connections and ensure that the nodes are able to communicate with each other. This is a complex and time-consuming process, particularly for systems that incorporate many different nodes and interconnection types. For at least these reasons, there is a desire for an improved system and method for efficiently creating and managing application instances in distributed computing systems.

SUMMARY

An improved system and method for efficiently creating and managing application instances in distributed computing systems is contemplated. In one embodiment, the system provides users with information regarding a set of recommended resources for the user's application, information regarding a set of available resources and their capabilities, and information on recommended matches between the two. The recommendations may be based on criteria provided by the user (e.g., priority information, cost limits, etc.) and on historical performance data collected by the system.

In some embodiments, the system may offer intelligent scheduling (i.e., placement of processes on resources) by helping the user select a logical topology (e.g., how many nodes and how many CPU/GPU cores in each node) based on system-provided recommendations that quickly guide the user to optimal configurations.

In some embodiments, the system is able to utilize feedback from previous resource selections (e.g. data captured from the execution of prior instances) to inform the recommendations and help user to refine their selections. For example, the system may assist the user in mapping logical application intra-relationships like "master-workers" onto a physical computing resource topology and in finding the best match for the user's application from the set of available computing clusters. The system may provide post-execution feedback to the user to help the user adjust (e.g., fine-tune) their application's configuration (e.g., scheduling on nodes or multi-node clusters).

A method for creating instances of applications in a distributed computing system is also contemplated. In one embodiment, a user is presented with a first control to specify an application that the user wishes to instantiate, a second control to specify a data file that the user wishes to use with the application, and a third control to specify a destination for results from the application. A set of controls for displaying and customizing a recommended logical topology for an application instance may also be presented. A second set of controls may display a set of available system resources in the distributed computing system and enable the user to select a subset upon which to instantiate the application using the recommended logical topology as customized by the user.

The instantiating process may comprise automatically creating and deploying containers and or virtual machines for each node in the user-customized recommended logical topology. A role control may also be provided to permit the user to specify an application role for each instance of the application (e.g., master or worker).

The first set of controls may enable to user to specify the number of nodes for each type of role (e.g., master nodes and worker nodes) and a required or desired connection type between different types of nodes. A list of selectable node representations corresponding to the user-customized recommended logical topology may be presented. In response to a node representation being selected, another set of controls may be displayed that show a recommended node configuration and permit the user to customize the recommended node configuration. The user may be enabled to specify a number of CPUs and Pus for each selected node.

Controls may also be presented for specifying a minimum bandwidth between the GPUs for the selected node, an amount of memory for each CPU for the selected node; and an amount of memory for each GPU for the selected node. A predicted execution time based on the user-customized recommended logical topology and size of the user-specified data file may also be displayed.

A control for specifying a maximum desired execution time control may be presented, and an execution time may be predicted based on the user-customized recommended topology and the size of the user-specified data file. Based on the predicated execution time, the user-customized recommended topology may be modified to meet the user-specified maximum desired execution time. Predicted execution times and costs for the user-customized topology may be displayed and update based on user-made changes to assist the user in their customization and optimization efforts.

The user may specify an interactive mode connection or a batch mode connection for the application and whether the user expects the application to CPU-bound, GPU-bound, memory-bound, network-bound, storage-bound, or don't know. The user may be presented with an option to save the user's customized recommended logical topology for later reuse or cloning and interconnectivity attributes for the available system resources such as bandwidth and latency.

A system for scheduling computing jobs is also contemplated. In one embodiment, the system comprises a plurality of interconnected computing resources and a management node having a configurator and a deployer. The configurator is configured to present a user with controls to specify an application that the user wishes to instantiate, a data file, and a destination for results from the execution of the application. The configurator may also present the user with a set of controls displaying a user-customizable recommended topology for an application instance based on the user's input. The configurator may also present the user with a set of controls for displaying and selecting a subset of available system resources in the distributed computing system upon which to instantiate the user-specified application. The deployer may be configured to instantiate an instance of the user-specified application on the user-selected subset of the available system resources with the recommended topology as customized by the user.

A method for creating instances of applications in a distributed computing system is also contemplated. In one embodiment, the method may comprise presenting a user with controls to specify (i) an application for instantiation, (ii) a data file for use with the application, and (iii) a destination for results from the application. The user may also be presented with graphical representations of available system resources in the distributed computing system and a logical topology for an instance of the application. The graphical representation may for example comprise a hierarchical diagram with nodes illustrating resource attributes such as CPU and GPU attributes, and the hierarchical diagram may depict interconnections between the resources based on available bandwidth (e.g., higher bandwidth interconnections may be represented by thicker lines).

The graphical representation of the logical topology may comprise one or more application primitives (e.g., master nodes and worker nodes) that are assignable by the user to specific available system resources to create a proposed mapping. The proposed mapping may be checked to detect problems in the proposed mapping to the user (e.g., primitives having requirements not met by the assigned resources, or sub-optimal assignment based on application primitive requirements or based on prior application instance execution history). A warning (e.g., a graphical problem indicator on the graphical representation of the available system resources) may be displayed to the user to convey information about the detected problems, and the user may be presented with a proposed alternate mapping that addresses the detected problems. An instance of the user-specified application may then be instantiated based on the mapping. The method may be implemented as instructions stored on a non-transitory, computer-readable storage medium that are executable by a processor of a computational device.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
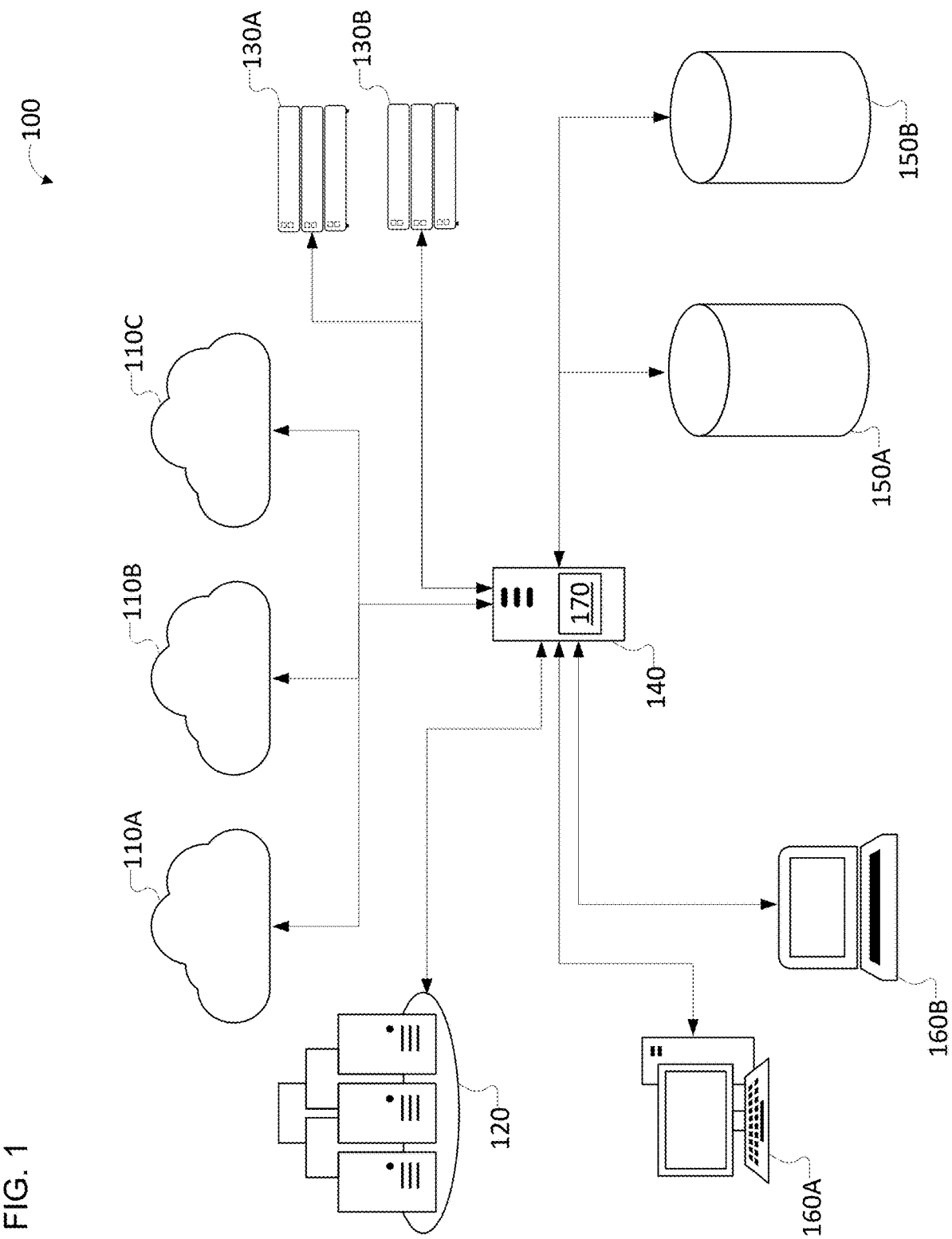
FIG. 1 is an illustration of one example of a system for intelligent scheduling of computing resources in a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their network-connected PCs (160A) and laptop or mobile devices (160B) via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with one, two, four, eight, etc., virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a datacenter 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. In some embodiments, management server 140 may be a high-performance computing (HPC) system with many computing nodes, and management application 170 may execute on one or more of these nodes (e.g., master nodes) in the cluster.

Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the server 140, partly on server 140 and partly on other computing devices in distributed computing system 100.

The management application 170 provides an interface to users (e.g., via a web application, portal, API server or CLI command line interface) that permits users and administrators to submit jobs via their PCs/workstations 160A and laptops or mobile devices 160B, designate the data sources to be used by the jobs, configure containers to run the jobs, and set one or more job requirements (e.g., parameters such as how many processors to use, how much memory to use, cost limits, job priorities, etc.). This may also include policy limitations set by the administrator for the computing system 100.

Management server 140 may be a traditional PC or server, a specialized appliance, or one or more nodes within a cluster. Management server 140 may be configured with one or more processors, volatile memory and non-volatile memory such as flash storage or internal or external hard disk (e.g., network attached storage accessible to server 140).

Management application 170 may also be configured to receive computing jobs from user PC 160A and mobile devices/laptops 160B, determine which of the distributed computing system 100 computing resources are available to complete those jobs, select which available resources to allocate to each job, and then bind and dispatch the job to those allocated resources. In one embodiment, the jobs may be applications operating within containers (e.g. Kubernetes with Docker containers) or virtual machine (VM) instances.

Figure 2:
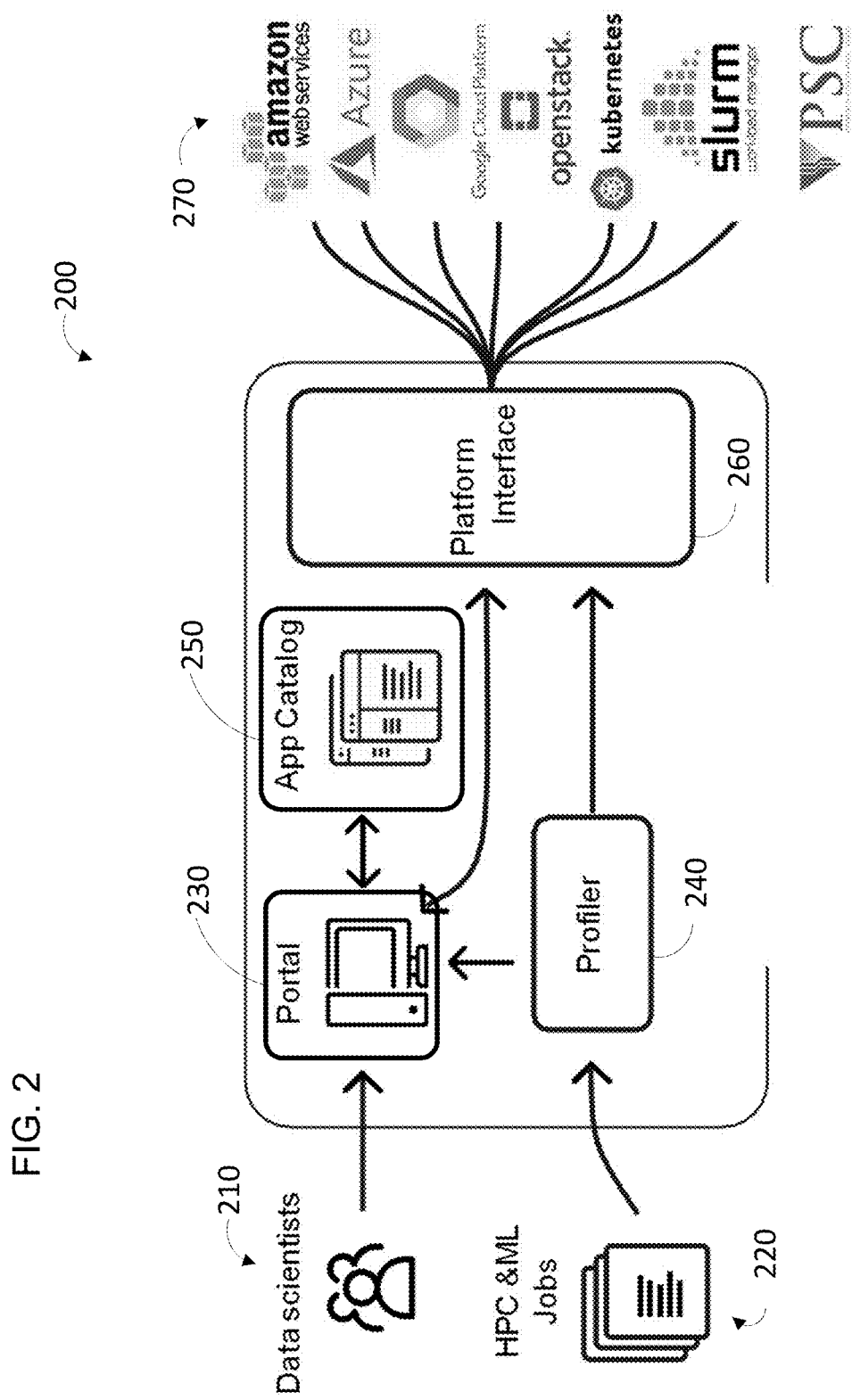
FIG. 2 is an illustration of one example of a system for creating application instances in a computing system.

Turning now to FIG. 2, an illustration of one example of a system for creating application instances in a computing system is shown. System 200 may for example be implemented using a management server executing a management application (e.g., such as management application 170 from FIG. 1). System 200 comprises different modules that enable users 210 to specify jobs 220 (e.g., high performance computing and machine learning applications) to be run on a distributed computing system (e.g. such as distributed computing system 100 from FIG. 1). One module is user interface module 230 which displays a portal that users can access to specify information about the application they want to run and provides controls to configure instances that will be used to run the application. Another module is profiler module 240, which receives applications specified by the user and profiles them in order to assist with instance creation. Profiling may for example include determining which resources are required by the applications. Application catalog module 250 may provide users with a list of predefined containers configured for particular applications that the user might want to use. These may include containers previously configured by the user or system administrators, as well as default containers for certain common applications. For example, a user may have created their application as a Jupyter notebook (Jupyter is a popular open-source application that allows users to create and share documents that contain live code, equations, and visualizations), in which case they would select a preconfigured Jupyter container from catalog module 250. Interface module 260 is configured to interface with various computing resources 270 including cloud computing services and bare metal computing systems.

Figure 3:
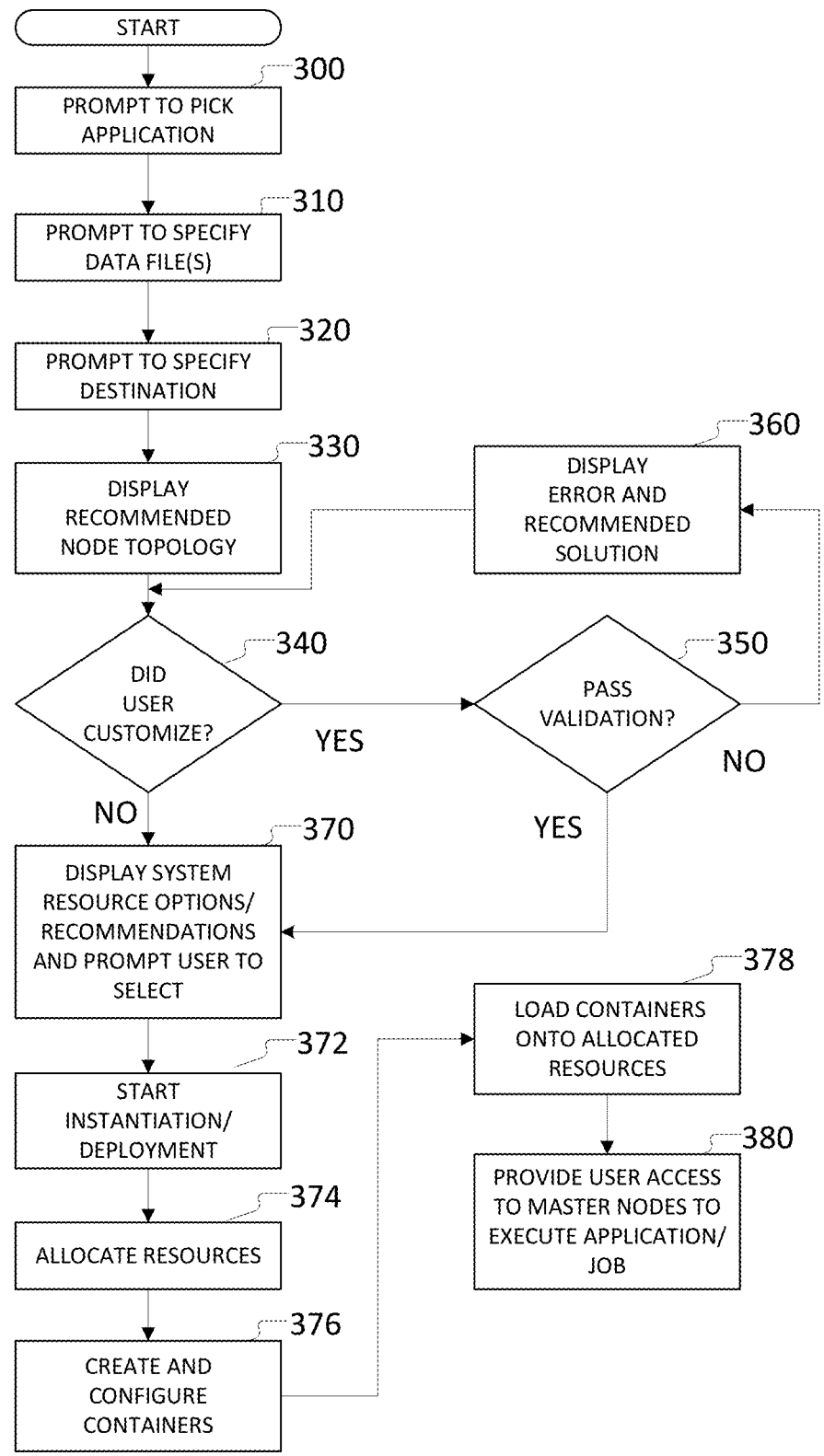
FIG. 3 is a flowchart of one example of a method for creating application instances in a computing system.

Turning now to FIG. 3, a flowchart of one example of a method for creating application instances in a computing system is shown. A user is prompted to specify an application (step 300). Using the example presented above the user would specify Jupyter as the application that they are using. There may be multiple options for a particular application. For example, an application (e.g., a Jupyter notebook) can be run in multiple modes, such as interactive or batch mode. Once the application has been specified, the user may be prompted to specify one or more data files to be used with the application (step 310). For example, a machine learning application that a data scientist has written might require training data sets or production data to be processed. Some applications may require a destination (e.g., output location) to be specified as well (step 320).

Based on the information input by the user, a recommended logical node or cluster topology is displayed (step 330). A logical topology is a high-level definition of how many processing nodes (e.g., master nodes and worker nodes) will be used and what in what hierarchy they are connected and to what resources (e.g., memory, network, storage) they are connected to. The recommendation may, for example, be based on known requirements for the particular application selected (e.g., information stored when the application was entered into the application catalog). The recommendation may also be based on other information provided by the user (e.g., the size of the data file to be processed, the location of the data file to be processed, whether the application will be run in interactive mode or batch mode, etc.). Customer-specific business rules (e.g., geography-based restrictions or compute provider-based restrictions) may also be specified by the user and/or system administrator and applied.

The user may be given the opportunity to modify the recommended node topology (step 340). If the user modifies the topology, the system may perform a validation check on the changes (step 350), and display error messages and recommended solutions (step 360). For example, if the user overrides a recommended topology of one master node having four worker nodes to delete the master node, an error message may be displayed that each worker node requires a master node. Similarly, if the user configures too many worker nodes for a single master node (e.g., exceeding a known limitation for a particular application), an error message may be displayed along with a recommendation for how many additional master nodes are required.

If no changes are made by the user, or if the user's changes pass validation, system resource options (including indicators of which ones are recommended) may be displayed, and the user may be prompted to select the option that will be used to run the job (step 370). These system resources options may for example include a list of bare metal systems and cloud providers with instance options capable of executing the user's application with the logical topology specified. The determination of which resources to offer may be based on a set of computing resource configuration files that include the different options for each of the bare metal and cloud computing systems. For example, the configuration options for a particular cloud computing provider may include a list of all possible system configurations and their corresponding prices. In addition to pricing, it may also include relative performance information (e.g., based on relative execution times for one or more test jobs executed on each cloud system configuration). The system resource options and recommendations may be determined by comparing the application information provided by the user (e.g., application, data file size and location. etc.).

Estimated compute times (e.g., based on the test job most similar to the user's application) and projected costs may also be presented to the user along with system resource options. For example, the options may be presented sortable based on estimated cost or estimated time to job completion. The options may also be sortable based on best fit to the user's specified application and logical topology.

Once the user makes their selection, the application may be instantiated and deployed (step 372). The specific hardware to be used may be allocated (e.g., cloud instances may be created with Kubernetes or Docker) (step 374), and containers may be automatically created for the application in the configuration specified (step 376). This may for example include creation of master node containers and worker node containers that are configured to communicate with each other. Containers may include all necessary settings for the application to run, including configurations for ssh connectivity, IP addresses, connectivity to the other appropriate containers (e.g., connected master and worker nodes), etc. The containers may then be automatically loaded onto the appropriate allocated resources (step 378), and the user may be provided access (e.g., to a master node) in order to start the application. Once the application is running, performance may be monitored, and access may be provided to the user (step 380).

Figure 4:
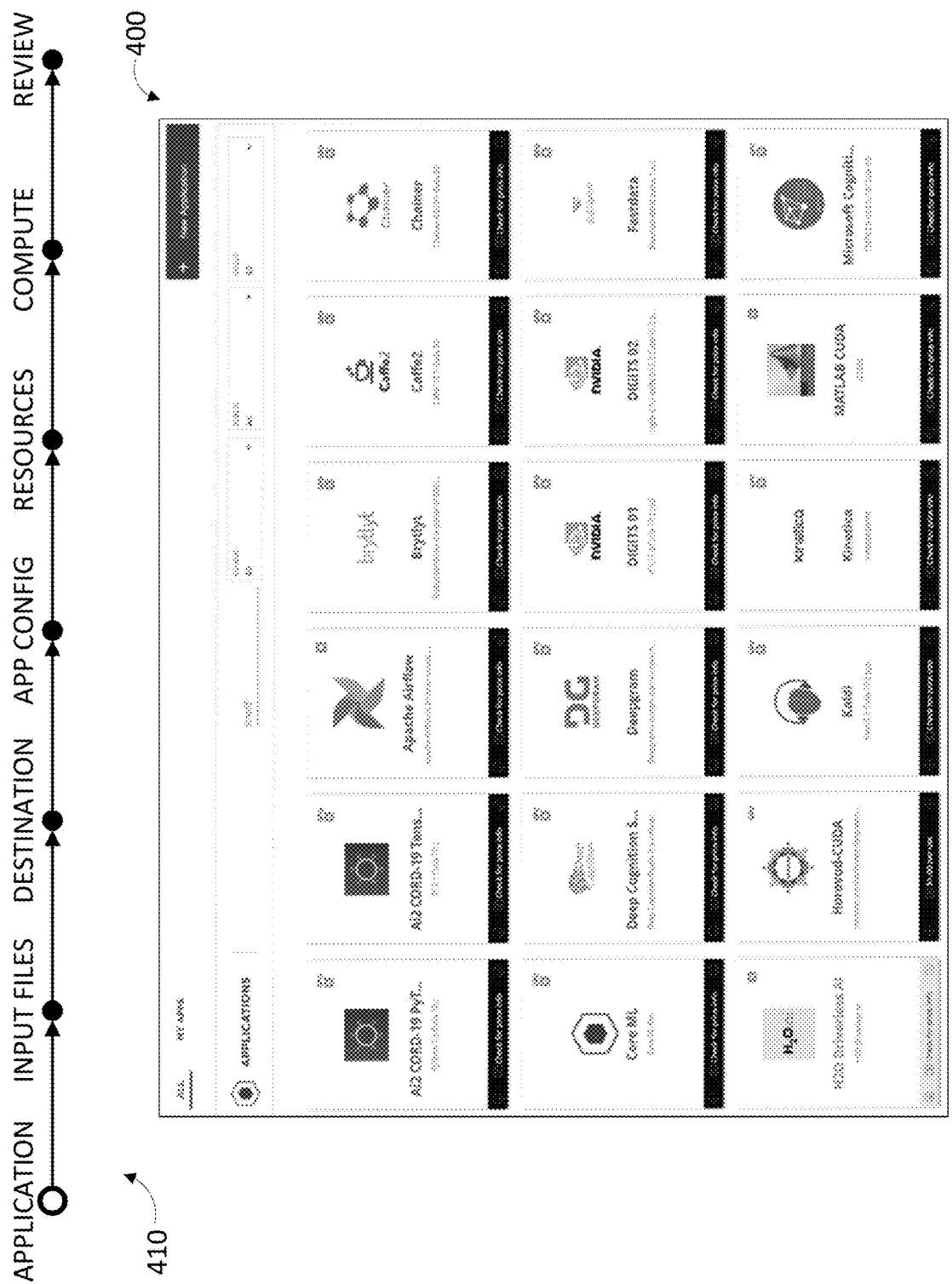
FIG. 4 is an example user interface for selecting an application.

Turning now to FIG. 4, an example user interface for selecting an application is shown. In this embodiment, a control 400 for specifying the application to be run may be presented to the user. The control 400 may include a catalog of predefined application containers. As noted above, there may be multiple entries for a single application (e.g., interactive mode, batch mode), and the entries may be searchable and sortable by various criteria. So called "empty containers" (e.g., configured without an application but OpenMPI) may also be offered with the option for the user to specify their own application to load into it. A flow diagram 410 of the steps for specifying, configuring and instantiating the application may also be shown as part of the user interface.

Figure 5:
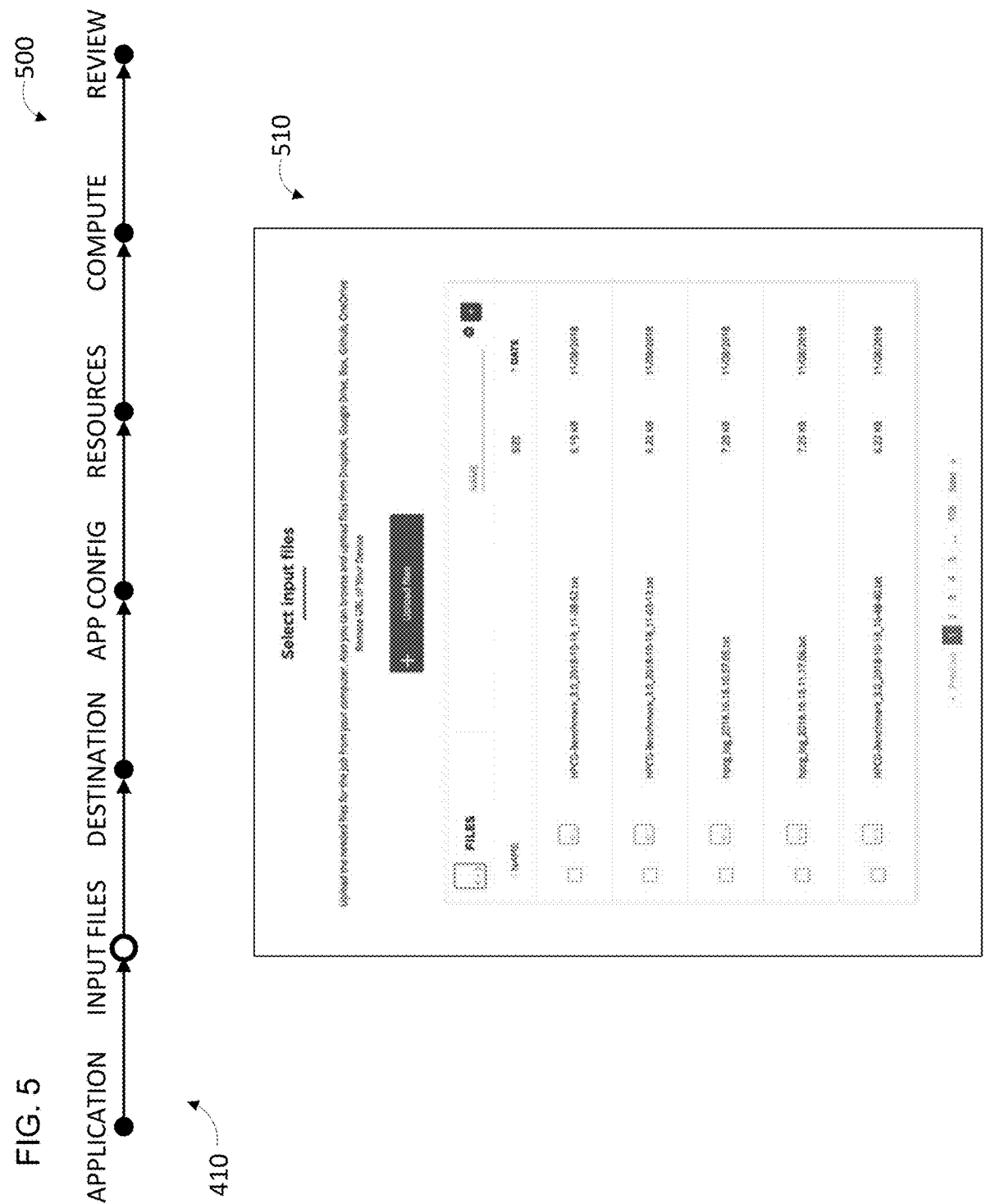
FIG. 5 is an example user interface for selecting input files.

Turning now to FIG. 5, an example user interface 500 with a control for selecting input files 510 is shown. The user may specify an existing data file on their local machine, or a network location. The input files may be checked (e.g., for their file type, location, and size), which may be used by the system in making recommendations. For example, the input files are very large, e.g., many terabytes, the time to transfer the files may impact the decision on where to run the application. Selecting a set of computer resources closer to the input files (or having a higher input/output network bandwidth) may be of increased importance for those instances.

Figure 6:
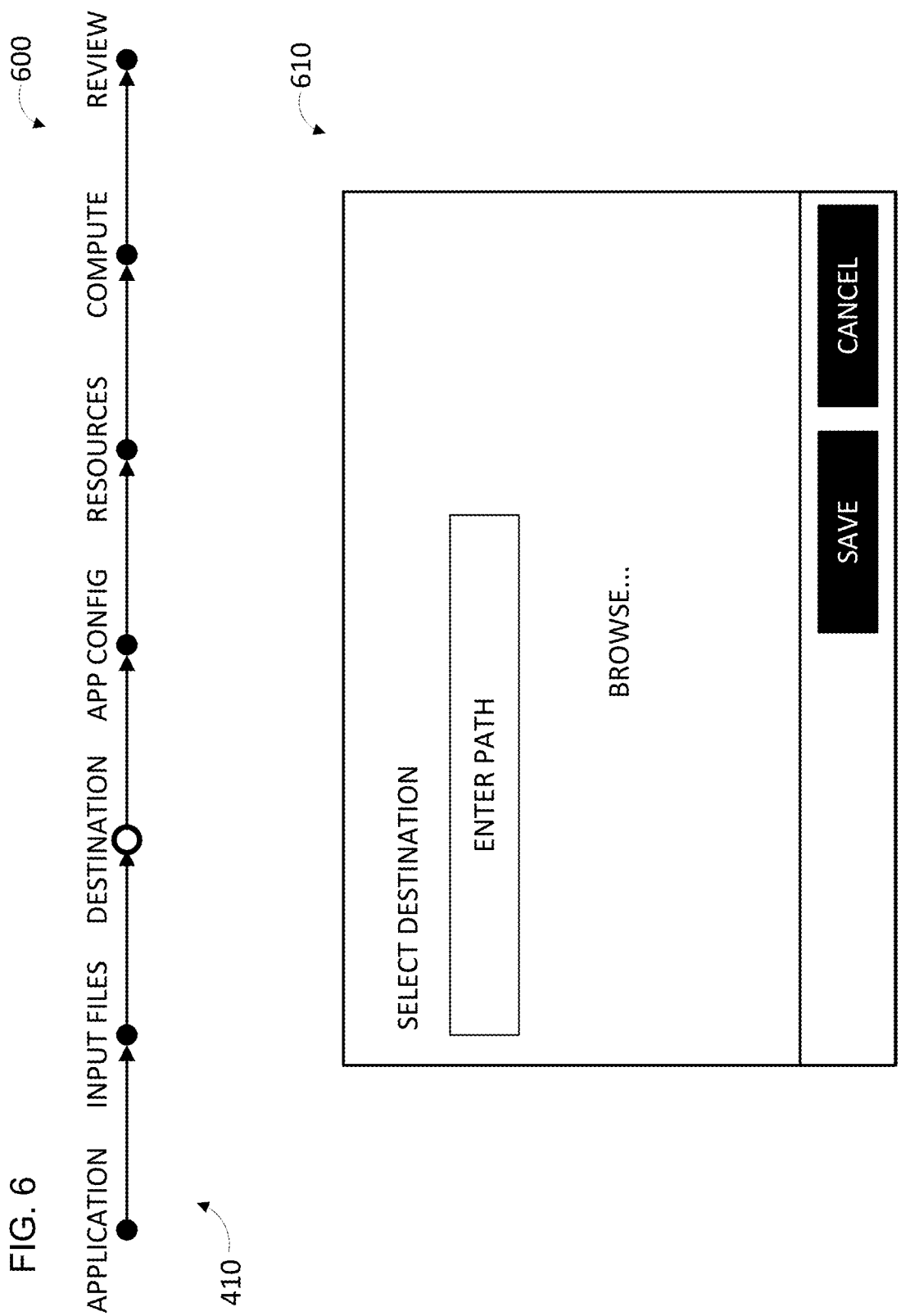
FIG. 6 is an example user interface for selecting a destination.

Turning now to FIG. 6, an example user interface 600 with a control for selecting a destination 610 is shown. As with the input files, the user may specify a location such as their local machine, or a network location. The destination location may also be used by the system in making recommendations. Note that in each stage of the user interface, the information from the previous step may be used by the system to customize the options based on the user's prior input. For example, if the user specifies an application to be run in interactive mode, there may not be an output file and no prompt for a destination need be provided.

Figure 7:
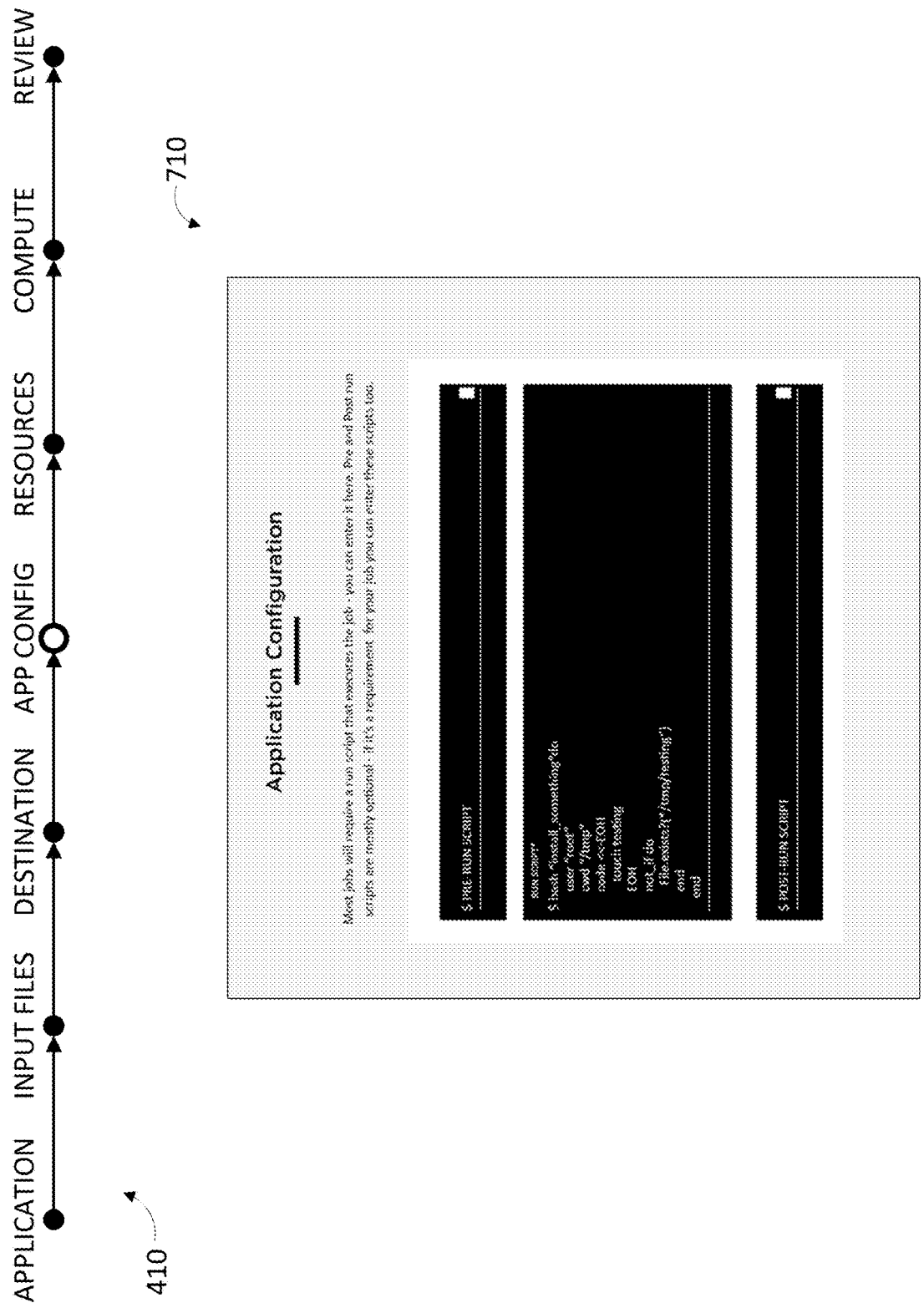
FIG. 7 is an example user interface for application configuration.

Turning now to FIG. 7, an example user interface including a control for specifying application configuration 710 is shown. This may for example include an interface permitting the user to specify one or more scripts. This may for example include one or more pre-run scripts to be run before executing the application, one or more post-scripts to run after execution (e.g., compress the results before they are downloaded to the specified destinations) and an execution script to actually execute the application (e.g., when in batch mode).

Figure 8:
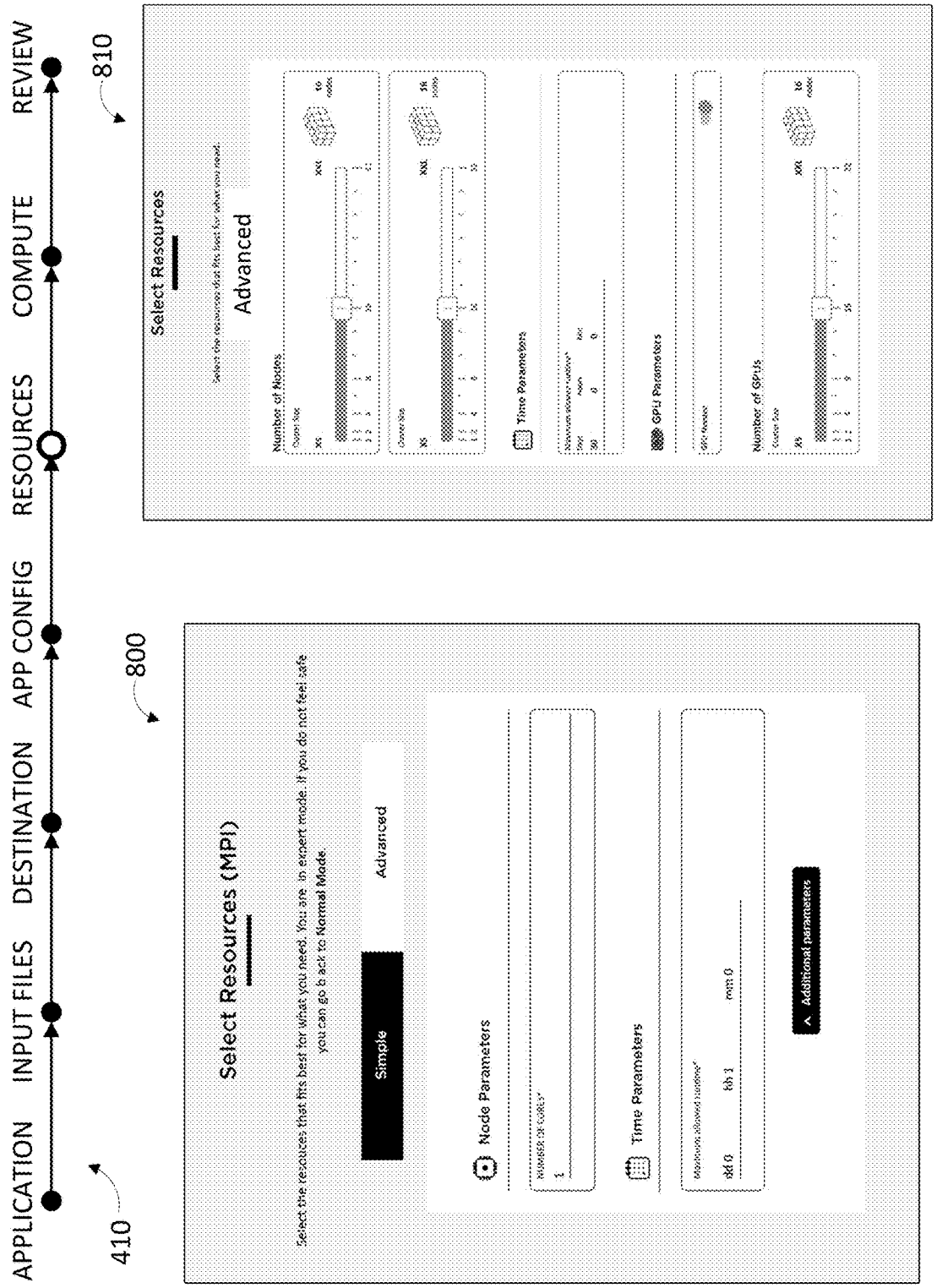
FIG. 8 is an example user interface for resource configuration.

Turning now to FIG. 8, example user interfaces with controls 800 and 810 for specifying resource configuration are shown. In this example, controls 800 and 810 permit a user to select a logical topology are shown. In this embodiment, control 800 presents a simplified interface, and control 810 presents an advanced interface to the user based on their input. In each control version, a recommended set of resources for the user-specified application are shown. For example, a recommended single node single core with a maximum runtime of 1 hour is presented in a simple interface of control 800, while a recommendation of two clusters with 16 cores each is recommended in a complex interface of control 810, along with a recommended maximum runtime of 30 days. A set of 16 GPUs are also recommended. The controls 800 and 810 permit the user to change the configuration from the recommendation (subject to subsequent validation).

Figure 9:
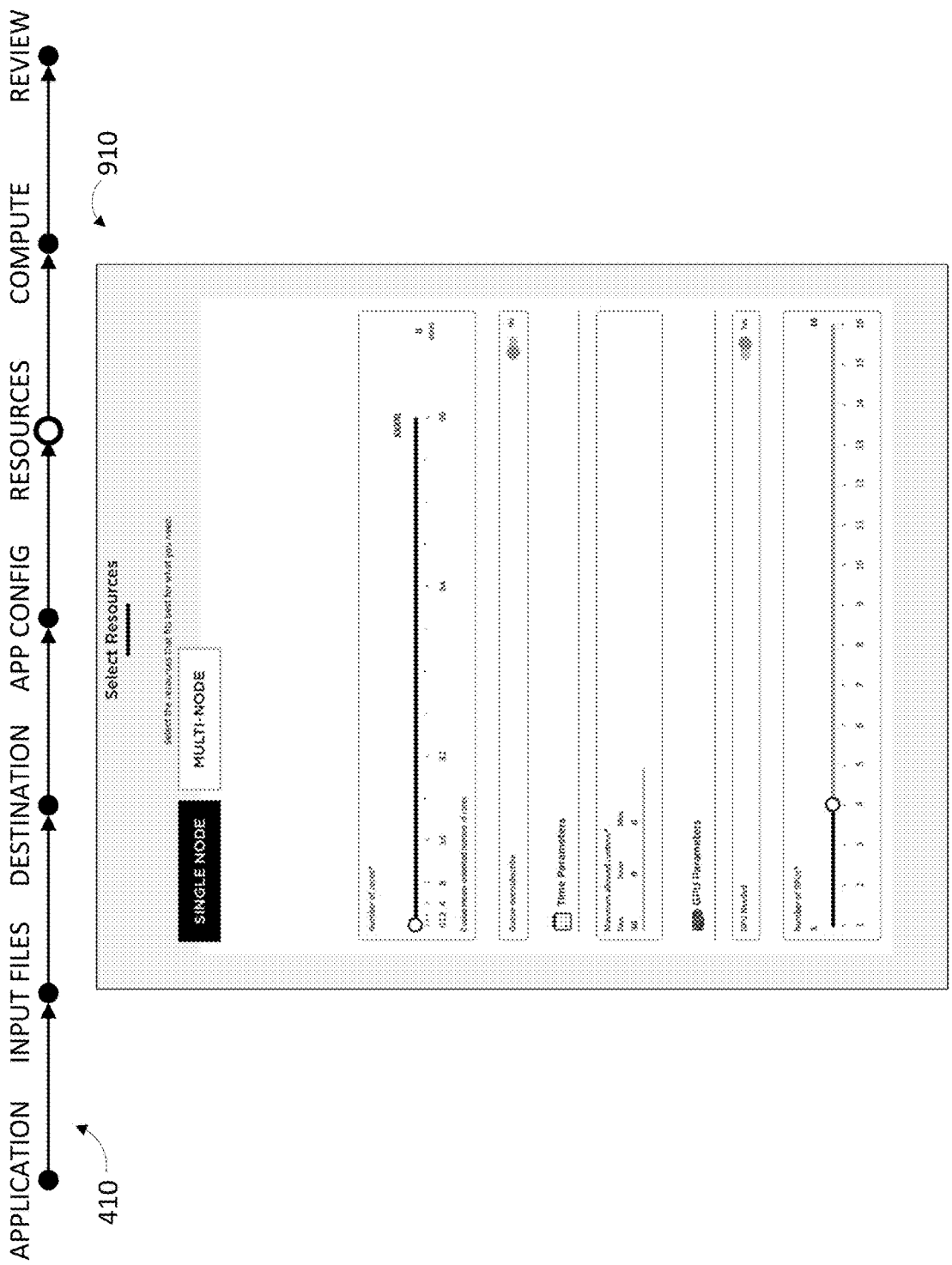
FIG. 9 is another example user interface for resource configuration.

Turning now to FIG. 9, another example user interface with a control for specifying resource configuration 910 is shown. In this example, tabs for single node and multiple node configurations are available, and the single node interface is selected. Based on the application the user selected, the data file, etc., a default or recommended configuration is shown. While a wizard-type interface is shown, in some embodiments the user may be presented with a graphical configuration that is drag-and-drop with a what-you-see-is-what-you-get (WYSWYG) interface to create logical system definitions.

Figure 10:
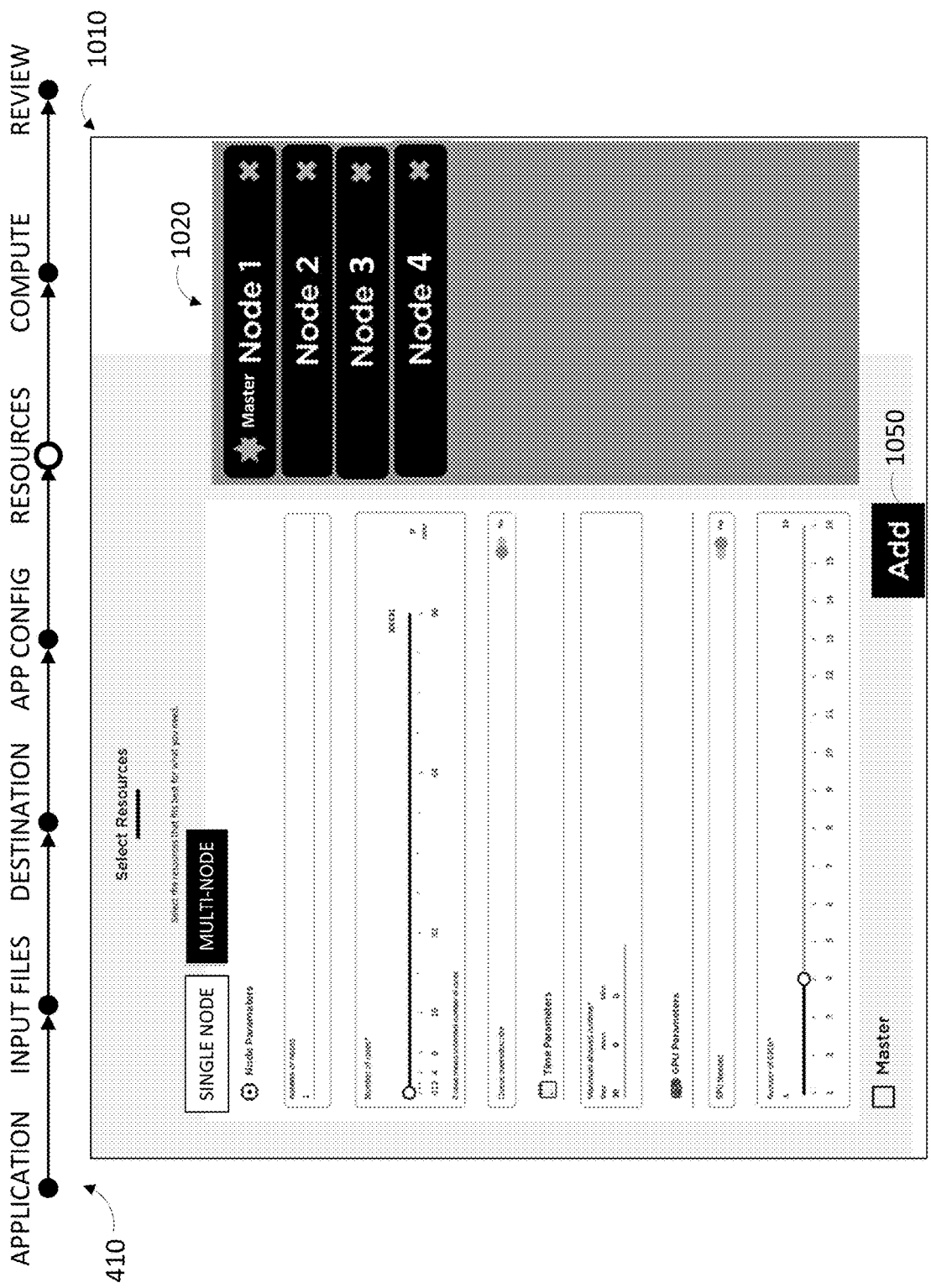
FIG. 10 is yet another example user interface for resource configuration.

Turning now to FIG. 10, yet another example user interface with a control for specifying resource configuration 1010 is shown. In this example, tabs for single node and multiple node configurations are presented, and the multi-node interface is presented. Nodes are listed in panel 1020, with master nodes highlighted and worker nodes associated with each master node listed below. Nodes in listed panel 1020 may be selected (e.g. clicked) to edit them (e.g., switch them between master and worker node roles). Worker nodes may be selected and dragged to change which master node they are associated with. In one embodiment, the user may be presented with controls to specify the minimum bandwidth or connection type (e.g., Mellanox ConnectX, RDMA, NVLINK, xGMI, GbE, 10 GbE, Inifiband SDR/QDR/NDR, etc.) between nodes. For example, the user may specify a minimum bandwidth of 100 Gbps between master and worker nodes and 10 Gbps between master nodes. The system may intelligently offer node types based on the primitives used by the application selected. For example, some applications utilize master and worker nodes, while others have parameter servers and clients. Other roles that may also be assigned include for example producer and consumer. Based on the application selected, the appropriate roles are presented as options for the user when creating new nodes or editing existing nodes. This role control permits the user to easily specify the logical application roles for nodes separate from the process of selecting the physical computing resources.

In some embodiments, the management application may include support for creating and specifying different roles for nodes and multiple application instances with multiple data sets. For example, a user may create a TensorFlow application to identify objects using a gradient descent and Horovod to identify objects. Gradient descent is an optimization algorithm that is used when training a machine learning model, and Horovod is an open source distributed deep learning framework for TensorFlow, which is an end-to-end open source platform for machine learning. The user might create a Jupyter notebook with Python to set parameters and do training, and then they might deploy their application on a Kubernetes cluster for production. In this example, the user might first deploy a first instance that acts as a consumer (e.g., the Jupyter notebook on a single node), and a second instance for training and prediction (e.g., a multi-node configuration with a Horovod master/controller node and four worker nodes that perform the gradient descent). In this example, the user would have six instances of the same application (i.e., the notebook, the master node that controls Horovod, and four worker nodes performing Horovod). The user may be presented with a graphical interface (e.g. WYSIWYG) with a tool palette for specifying the roles of each application instance, relationships between the nodes and their roles, with visual representations of input, output, etc. Once completed, the management application may provide the user with another interface with which to apply the multi-instance logical topology to actual computing resources available in the distributed computing system (e.g., bare metal and cloud computing systems).

A default configuration for multi-node configurations may also be presented based on the application selected. For example, if the user has specified a Jupyter application, the recommended default configuration presented may be a multi-node configuration with one master and four workers (as shown in the figure). However, the user may adjust the recommendation and configure one or more additional nodes using the controls presented and clicking the Add control 1050. The configured node is then added to the configuration with all the specified parameters (and appears in list 1020). The user may click on one of the added Nodes to edit the parameters for just that one node (e.g., if needed for asymmetrical workloads).

In some embodiments, small (e.g., single node), medium (e.g., multi-node), and large (e.g., multi-node, multi-master) recommended configurations may be offered to the user. The recommendations may be determined by the system based on preconfigured information specifying the relationship between the nodes or containers used by an application for certain tasks. For example, a particular application's nodes (i.e., containers) may have certain characteristics that are independent of deployment. For example, one node might act as a producer node while another might act as a consumer. Given this producer to consumer relationship, a certain amount of communication will be required between the nodes. Based on that amount of communication (e.g., known by profiling the application before its default containers are created), the management application may be configured to recommend configurations that are better suited to that application. If the producer-consumer relationship typically generates a large amount of traffic that is latency sensitive or bandwidth sensitive, the management application may recommend configurations with low latency and or high bandwidth interconnections. This information may be used not only for recommending logical topologies, but also for subsequent stages involving the selection of the actual compute resources upon which the logical topology is created. It may also be used for validation after the user customizes the default or recommended configurations for an application.

In some embodiments, an expert mode may also be offered (e.g., for expert users or users that want to experiment). In this mode, verification or checking may be relaxed and additional controls (e.g., minimum memory per node)

may be presented. In one embodiment, the expert mode may permit the user to visually edit (or draw/create) a desired cluster topology by selecting components from a palette of components (including nodes, node roles, CPUs, GPUs, memory, interconnects, network connections, storage, etc.) and connecting them visually (e.g., clicking and dragging interconnects between them). This can include software defined networking and restrictions (e.g. this set of nodes must all be on the same cluster). If a multi-container configuration is being configured, the user may visually define the application by specifying the relationship between containers. Once completed, the user may submit the proposed configuration to the system, and the system may find the best match for deployment from all the computing resources known to it.

Feedback may be provided to the user by the management application for both logical topology and compute resource selections. For example, a warning may state that a particular configuration does not scale well, or that no systems exist with enough nodes to satisfy the configuration the user has created in expert mode. For example, the system may warn the user that a high bandwidth interconnect is needed (e.g., based on a particular producer-consumer configuration) if the user has not selected a high bandwidth link. These types of recommendations/feedback can be determined by the system based on preconfigured application information (entered when the template application container is initially created) and based on historical application performance data previously observed by the system.

Figure 11:
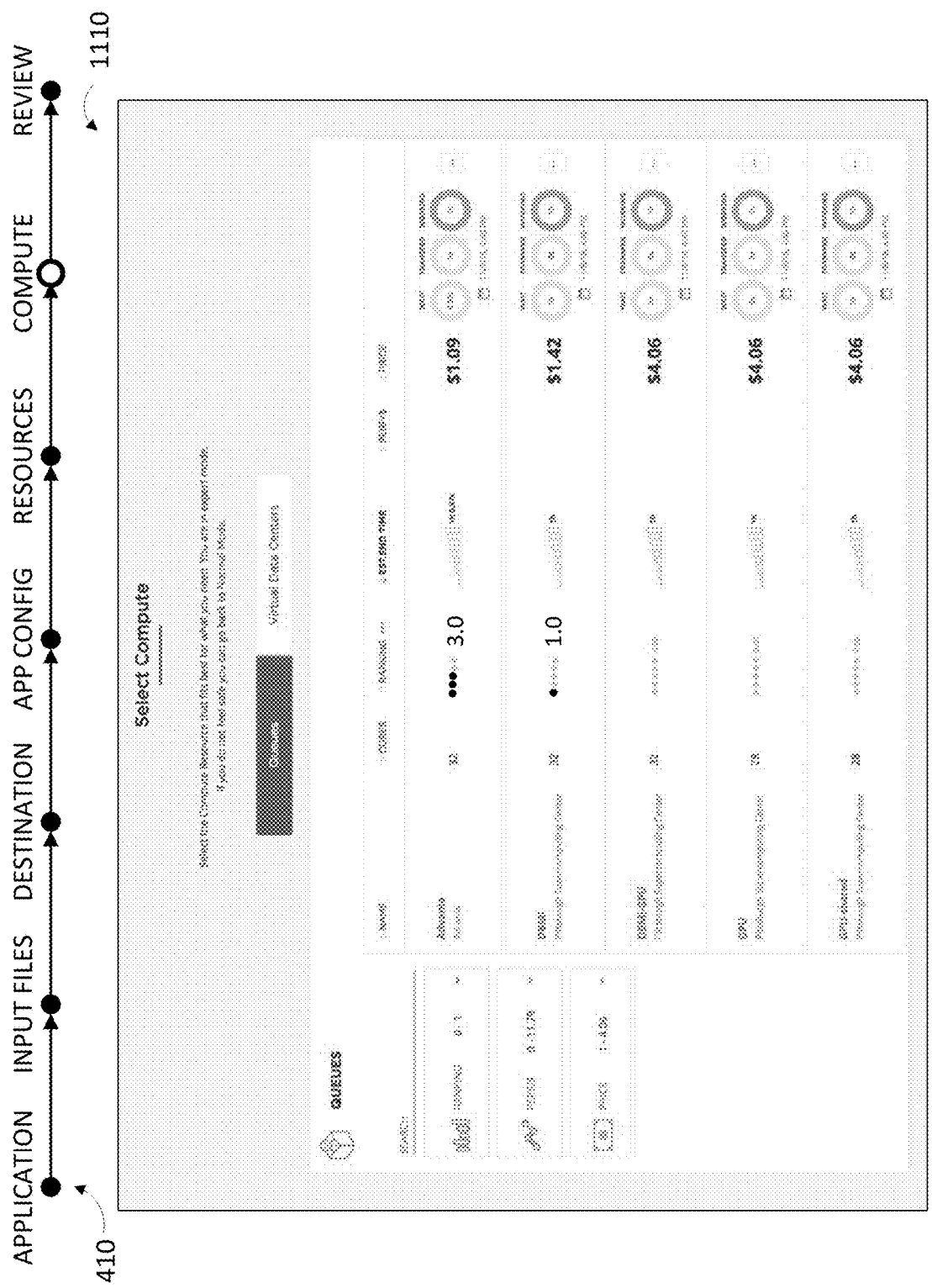
FIG. 11 is an example user interface for selecting computation resources.

Turning now to FIG. 11, an example user interface with a control for selecting system resources 1110 is shown. In this example, different computing resource options (e.g. bare metal systems and cloud compute systems) matching the resources needed by the application topology configured are presented to the user. One or more recommended options may be highlighted (e.g., with a recommended tag or star), and the options may be sorted based on price, performance per price, or based on how well the option is predicted to meet the user's requirements (e.g., on a 5-point scale). For sorting, the system may be configured to calculate cost based on predicted execution time, including wait, setup and transfer times based on the information input by the user. Once the user selects one of the options, the application may be instantiated and deployed to the selected computing resources.

Figure 12:
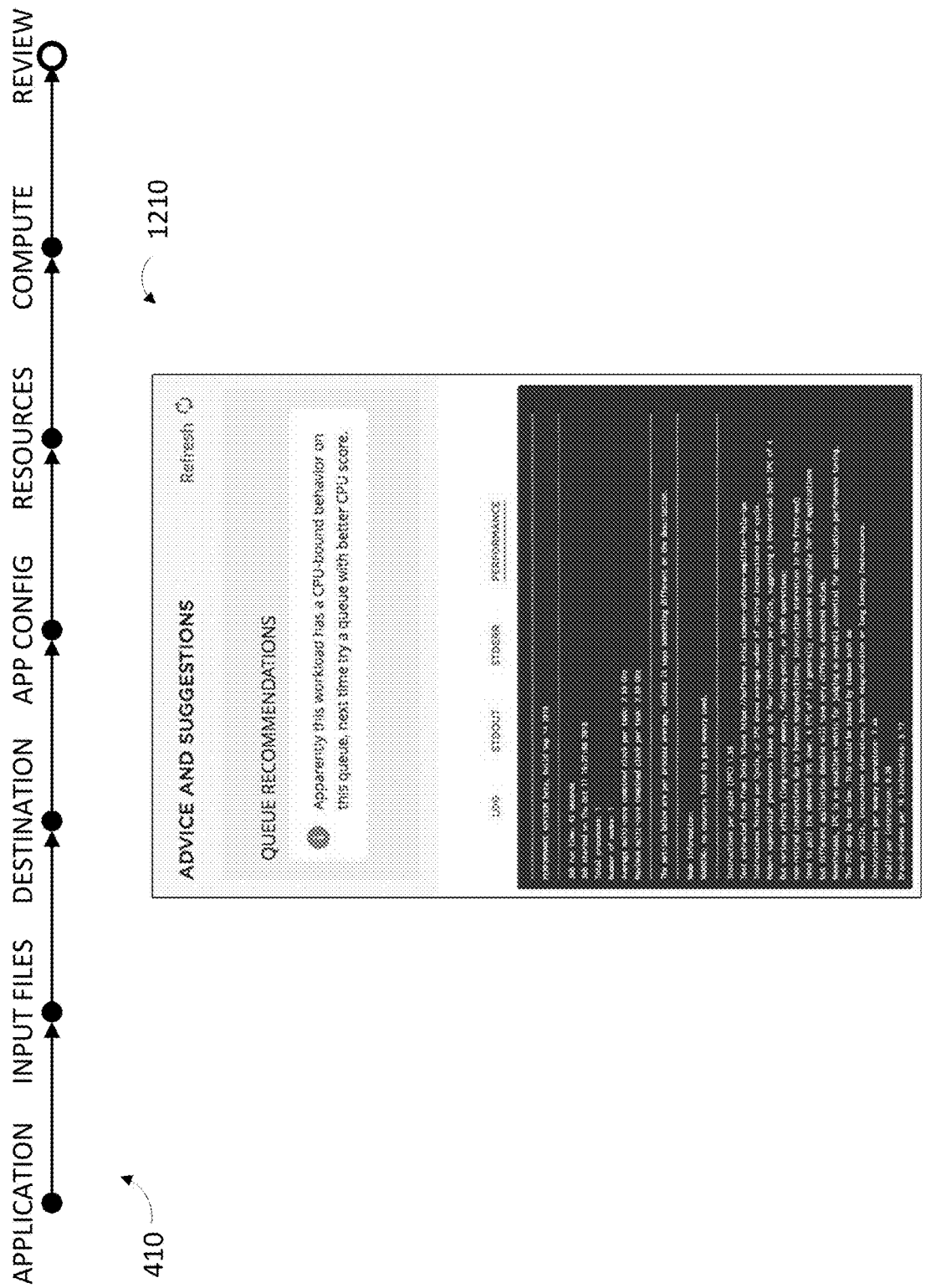
FIG. 12 is an example user interface for providing feedback on instance configurations.

Turning now to FIG. 12, an example user interface with a control for providing feedback on instance configurations 1210 is shown. When the application is running, performance data (e.g., instructions counters—if available, cycles counter, page-faults, and context-switches) may be tracked. For example, performance tracking programs may be included in the containers that are automatically created by the system. Based on the performance data collected, recommendations for improving performance on subsequent runs of the application may be presented to the user. For example, if the application spent significant time with 100% CPU utilization, the system may recommend adding additional CPUs for future runs.

Figure 13:
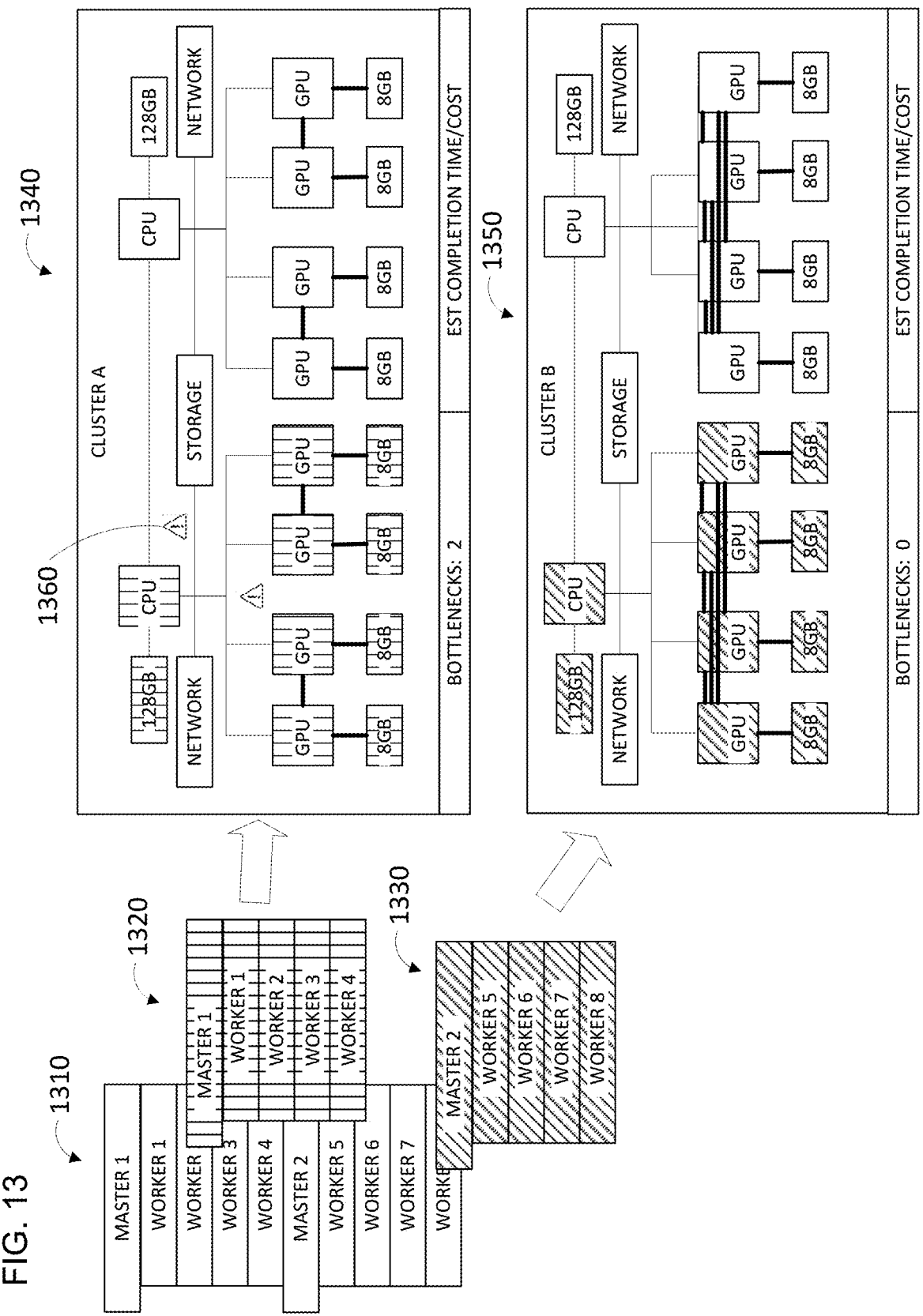
FIG. 13 is another example user interface for selecting computation resources.

Turning now to FIG. 13, another example user interface for selecting system resources is shown. In this embodiment, a graphical representation 1310 of the logical topology of the application selected is shown together with a graphical representation of two different available computing resources 1340 and 1350. While two representations are presented in the example, more are possible and contemplated (e.g., accessible by scrolling). The graphical representation may be based on configuration information for each of the systems (e.g., entered by a system administrator or captured based on configuration files). The user interface permits the user to select and drag subsets of nodes (e.g., subset 1320 and subset 1330) onto one of the graphical representations of the computing resources 1340. The representation of the resources used for the selected subsets of nodes may change (e.g., change color or pattern or outline) to indicate that they have been allocated to the selected subset of nodes.

In one embodiment, the system may be configured to display warnings 1360 such as icons or network connections in different colors. The warnings may be based on checks of physical availability (e.g. not enough nodes available to meet the requested configuration) and logical checks (e.g. a worker node without a corresponding master node). Warnings or color codes may also be used to indicate the predicted amount of estimated bandwidth used on each interconnect. For example, the thicker lines in computing resource 1350 between some GPUs and GPUs and memory indicate that these are high bandwidth connections. The color may be changed to highlight for the user which ones are predicted to become bottlenecks (or are likely to max out their capacity) based on the application and roles selected.

In some embodiments, a similar user interface may be used in providing feedback to the user once a job is completed. For example, an application that spent a significant percentage of execution time waiting for data transfers between GPUs might cause a bottleneck warning to be displayed by the graphical connection depicting the connection between the GPUs.

In some embodiments, the system may provide a save configuration option that permits the user to save their configurations to a file (either locally to their device, to a network location, or to the management system's storage) so that they can be reused later (e.g., rerun, edited, or cloned to create new configurations). The management application may store captured performance data for each run of the configurations used to further improve its recommendations.

Figure 14:
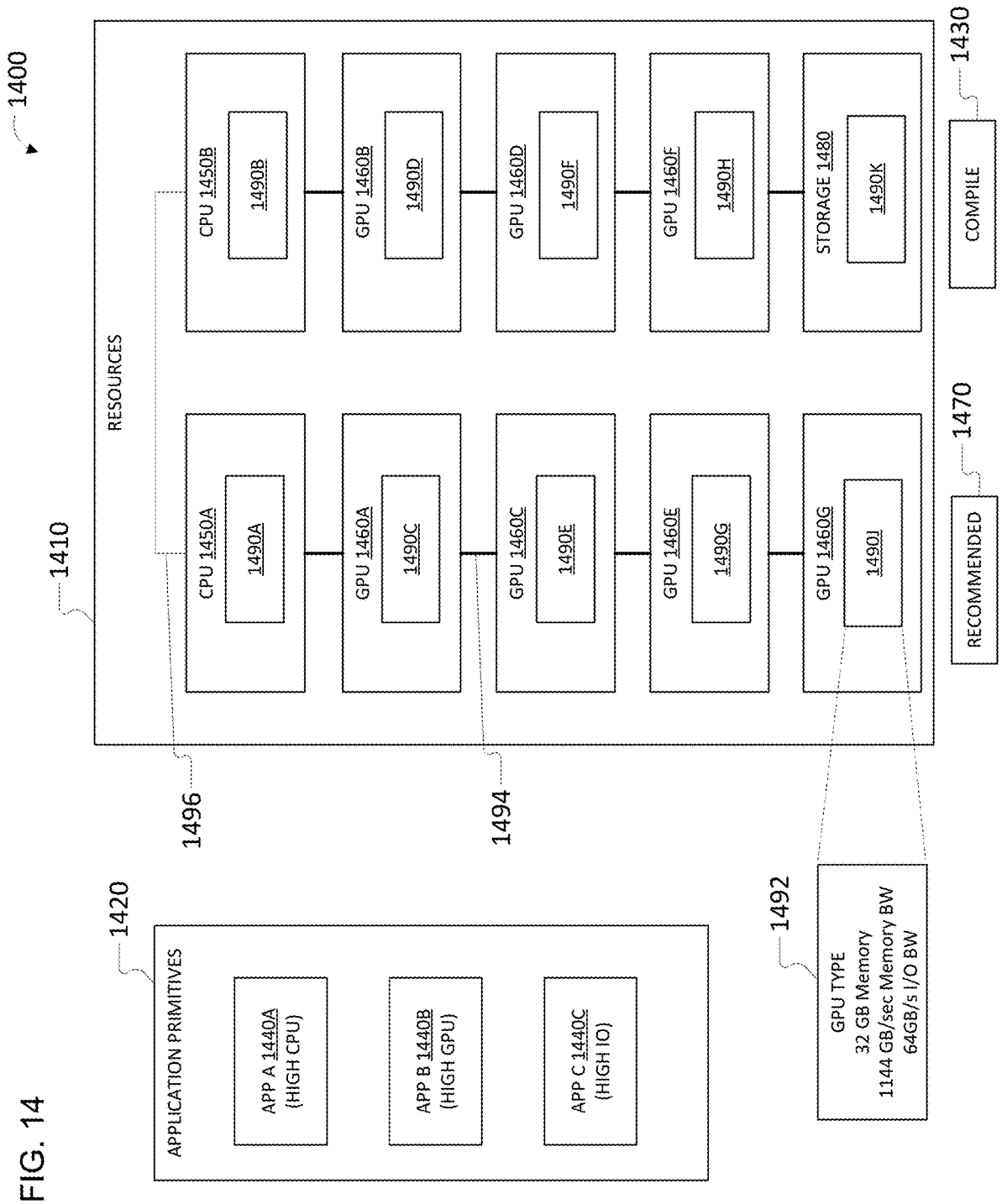
FIG. 14 is yet another example user interface for selecting computation resources.

Turning now to FIG. 14, another embodiment of a user interface 1400 for selecting computation resources in an infrastructure management application (e.g., for a SAAS/PAAS/IAAS system) is shown. Once the user has specified an application or applications that they desire to instantiate, the user may be presented with a graphical representation of available system resources 1410 in the distributed computing system. In this example, the graphical representation comprises a hierarchical diagram illustrating various system resources, including CPU nodes 1450A-B, GPU nodes 1460A-G, and storage node 1480. Node representations may include attribute information 1490A-K such as CPU/GPU type and memory, and additional information may be displayed when the particular node is selected or hovered over, as illustrated by pop-up details display 1492, which includes additional information such as memory and I/O bandwidth available to the node. Other information such as projected cost, power usage, etc., may also be presented.

A list of application primitives 1420 may also be presented, such as application master nodes, and application worker nodes. Each application primitive may have different resource requirements. For example, application primitive 1440A requires high amounts of CPU processing, while application primitive 1440B requires high amounts of GPU processing, and application primitive 1440C requires high amounts of I/O. The application primitives may be selectable and assignable (e.g., via click and drag) to selected system resources in graphical representation 1410.

Information about the interconnections between nodes may also be presented in the graphical representation of available system resources 1410, such as the bandwidth and or latency between nodes. In one embodiment, high bandwidth connections may be represented by thicker lines such as line 1494, while lower bandwidth connections may be represented by thinner lines such as line 1496.

A recommended mapping control 1470 may be presented to the user that, when activated, automatically calculates a recommended number of each application primitive (e.g., based on observed performance data from prior executions of the same or similar applications) and assigns those application primitives to available system resources to achieve an optimal or near-optimal mapping. For example, linear programming (LP), gradient descent for linear regression with multiple features, or a reinforcement learning algorithm (e.g., based on prior executions of the same or similar applications) may be used to calculate the optimal or near-optimal mappings. In some embodiments, the recommended mapping may be displayed in the user interface, and the user may be able to further customize the mapping based on their particular needs.

A compile control 1430 may be presented to permit the user to submit their mapping, whether it be their own mapping, a recommended mapping, or a customized recommended mapping. In some embodiments, the system may be configured to detect and flag problems in the mapping as part of the compile process. For example, if an application primitive requires or would significantly benefit from a particular type of resource (e.g., storage bandwidth or GPU compute resources) and those resources are available but not part of the node assigned to that application primitive, then a problem flag may be displayed on that node.

Figure 15:
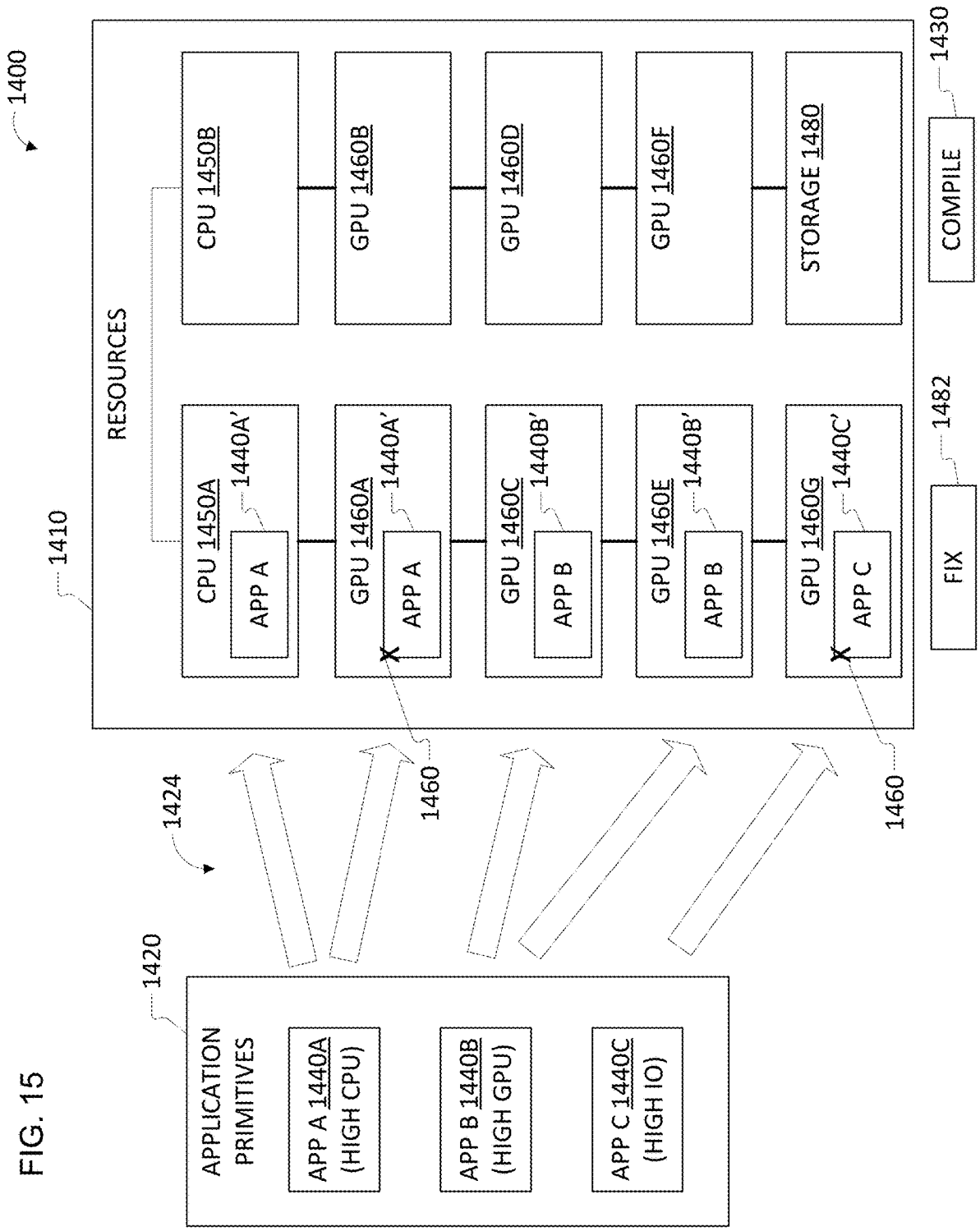
FIG. 15 is an example illustrating the operation of the user interface from FIG. 14.

Turning now to FIG. 15, another example illustrating the operation of the user interface from FIG. 14 is shown. In this example, application primitives 1140A-C are selected and dragged (as indicated by arrows 1424) to assign them to nodes in the graphical representation of available system resources 1410. Specifically, application primitive 1440A is assigned/mapped to CPU node 1450A, and GPUs node 1460A and 1460C (as indicated by the representations 1440A'), application primitive 1440B is assigned/mapped to GPU node 1460E (as indicated by the representation 1440B' of application primitive 1440B), and application primitive 1440C is assigned/mapped to GPU node 1440G (as indicated by the representation 1440C' of application primitive 1440C).

In one embodiment, in response to the user selecting the compile control 1430, a requirements problem check may be performed. In the example shown, the mappings for GPU nodes 1460A and 1460G receive problem flag indicators 1460 because application primitive 1440A requires high CPU and is assigned to a GPU node when a CPU node 1450B is available and application primitive 1440C requires high 10 and is assigned to a GPU node that does not have a direct high bandwidth connection to storage and nodes 1460F and 1480 are available. In the event of problem flags, a fix control 1482 may be presented to the user that when selected initiates an automated error correction process to reassign application primitives from nodes that do not have the required resources to those available nodes that do. Similar logic to that invoked by the recommend control 1470 may be used to determine optimal or improved mappings.

Figure 16:
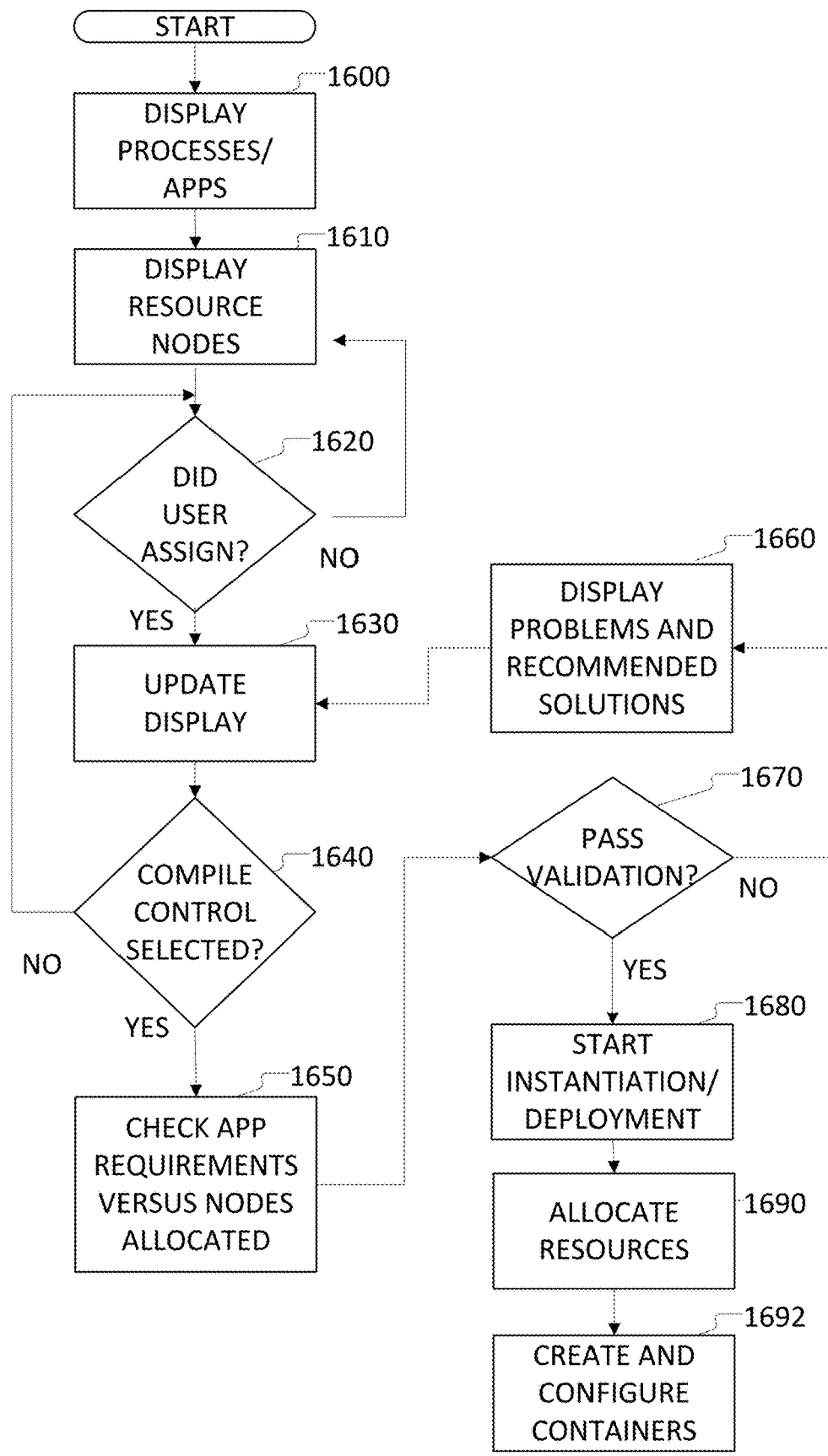
FIG. 16 is a flowchart of one example of a method for selecting resources for application instances.

Turning now to FIG. 16, a flowchart of one example of a method for selecting resources for application instances is shown. In this embodiment, a set of processes, applications, or application primitives are displayed (step 1600). A graphical representation of available system resources in the distributed computing system, such as nodes and interconnections are also displayed (step 1610) with controls permitting the user to make assignments/mappings. In response to the user assigning a process, application, or application primitive to a system resource (step 1620), the display may be updated (step 1630). Once the user is finished and invokes a compile control (step 1640), the processes', applications', and application primitives' requirements are checked relative to the assigned system resources (step 1650). If requirements are not met (step 1670), problems are highlighted and recommended solutions maybe displayed (step 1660). If requirements are met (step 1670), instantiation and deployment may be started (step 1680) using the specified mapping. This may include allocating the mapped resources (step 1690) and creating and configuring containers for those resources (step 1692).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for creating instances of applications in a distributed computing system, the method comprising:
   presenting a user with a first control to specify an application that the user wishes to instantiate;
   presenting the user with a second control to specify a data file that the user wishes to use with the application;
   presenting the user with a third control to specify a destination for results from the application;
   presenting the user with a first set of controls displaying a recommended logical topology for an application instance, wherein the first set of controls permit the user to customize the recommended logical topology; and
   presenting the user with a second set of controls displaying a set of available system resources in the distributed computing system, wherein the second set of controls enable the user to select a subset of the available system resources upon which to instantiate; and
   instantiating an instance of the user-specified application on the user-selected subset of the available system resources with the recommended logical topology as customized by the user.

2. The method of claim 1, wherein the instantiating comprises automatically creating and deploying containers for each node in the user-customized recommended logical topology.

3. The method of claim 1, further comprising providing a role control to the user, wherein the role control permits the user to specify an application role for each instance of the application.

4. The method of claim 1, wherein the instantiating comprises automatically creating and deploying virtual machines to the user-selected subset of the available system resources.

5. The method of claim 1, wherein the first set of controls comprise controls for specifying a selected role for each node, wherein the selected role is selected from a set of options presented based on the application specified by the user.

6. The method of claim 1, wherein the first set of controls comprise controls for specifying:
   a number of master nodes; and
   a number of worker nodes.

7. The method of claim 6, wherein the first set of controls comprise controls for specifying a requested connection type between the master nodes and the worker nodes.

8. The method of claim 6, further comprising displaying a list of selectable node representations corresponding to the user-customized recommended logical topology, wherein, in response to a node representation being selected, a third set of controls is displayed, wherein the third set of controls display a recommended node configuration and permit the user to customize the recommended node configuration.

9. The method of claim 8, wherein the third set of controls comprise controls for specifying:
   a number of CPUs for the selected node; and
   a number of GPUs for the selected node.

10. The method of claim 9, wherein the third set of controls comprise controls for specifying a minimum bandwidth between the GPUs for the selected node.

11. The method of claim 9, wherein the third set of controls comprise controls for specifying:
    an amount of memory for each CPU for the selected node; and
    an amount of memory for each GPU for the selected node.

12. The method of claim 1, further comprising displaying a predicted execution time based on the user-customized recommended logical topology and size of the user-specified data file.

13. The method of claim 1, further comprising:
    presenting a maximum desired execution time control;
    predicting an execution time based on the user-customized recommended topology and the size of the user-specified data file; and
    modifying the user-customized recommended topology to meet a user-specified maximum desired execution time.

14. The method of claim 1, further comprising displaying a predicted execution cost for the user-customized recommended logical topology.

15. The method of claim 6, wherein the first set of controls comprise controls for specifying an interactive mode connection or a batch mode connection for the application.

16. The method of claim 6, wherein the first set of controls comprise controls for specifying whether the user expects the application to CPU-bound, GPU-bound, memory-bound, network-bound, storage-bound, or don't know.

17. The method of claim 6, further comprising presenting the user with an option to save the user-customized recommended logical topology for later reuse or cloning.

18. The method of claim 1, further comprising presenting the user with interconnectivity attributes for the available system resources, wherein the interconnectivity attributes comprise bandwidth, and latency.

19. A system for scheduling computing jobs, the system comprising:
- a plurality of interconnected computing resources;
- a management node connected to the plurality of interconnected computing resources, wherein the management node comprises:
  - a configurator and a deployer, wherein the configurator is configured to:
    - present a user with a first control to specify an application that the user wishes to instantiate;
    - present the user with a second control to specify a data file that the user wishes to use with the application;
    - present the user with a third control to specify a destination for results from execution of the application;
    - present the user with a first set of controls displaying a recommended topology for an application instance based on the user's input on the first, second, and third controls, wherein the first set of controls permit the user to customize the recommended topology; and
    - present the user with a second set of controls displaying a set of available system resources of the plurality of interconnected computing resources, wherein the second set of controls enable the user to select a subset of the available system resources upon which to instantiate; and
  - wherein the deployer is configured to instantiate an instance of the user-specified application on the user-selected subset of the available system resources with the recommended topology as customized by the user.

* * * * *